3,284,141
THREE-AXLE COMPENSATOR BRAKING SYSTEMS
Edmond Henry-Biabaud, Paris, France, assignor to Societe
Anonyme Andre Citroen, Paris, France
Filed July 19, 1965, Ser. No. 472,903
Claims priority, application France, July 27, 1964,
983,134, Patent 1,410,287
1 Claim. (Cl. 303—7)

A system for distributing the braking force among two axles of a vehicle is already known wherein a brake pedal controls the reaction slide valves of a pair of compressed-fluid distributors controlling the braking pressures applied to the two axles respectively, the distribution of the braking force applied to the pedal among the two slide valves being obtained by automatic displacement, as a function of the load, of the point at which the effort is applied to a compensator lever bearing with each end on one of said slide valves.

It is the essential object of the present invention to provide a system for distributing the braking force among three axles, notably the two axles of a tractor and the axle of a truck trailer hauled by this tractor.

This distributor system comprises three reaction slide valves adapted to control, the first and second ones, the tractor brakes, and third one, the trailer brakes; a compensator lever engaging the first and second slide valves, a roller moving automatically on the first compensator lever in a manner responsive to the tractor load, another compensator lever disposed on said roller, adapted to engage said third slide valve and responsive to the action of a knob receiving the brake pedal thrust.

The features and advantages of this invention will appear more completely as the following description proceeds with reference to the accompanying drawings, in which.

Figure 1:
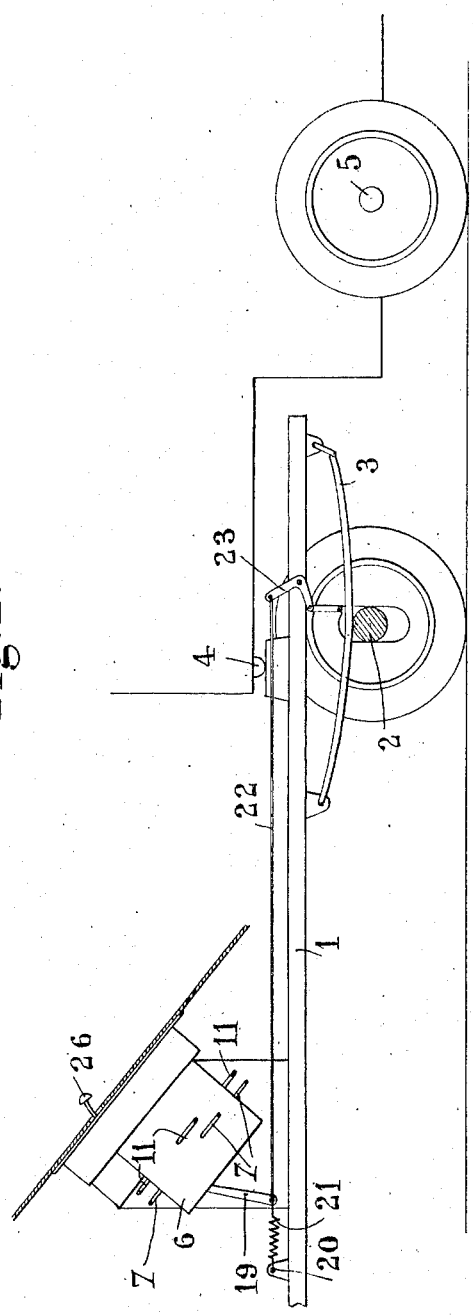
FIGURE 1 is a diagrammatically elevational view showing the tractor and truck trailer assembly.

The assembly in which the braking force is distributed comprises a tractor having its frame 1 supported by two axles, notably a rear axle 2 provided with an elastic suspension system 3. Hauled by this tractor is a trailer of which the load is carried at the front end by a front roller or swivel member 4 bearing on the rear end of the tractor frame 1, and at the rear end by a single axle 5.

Figure 2:
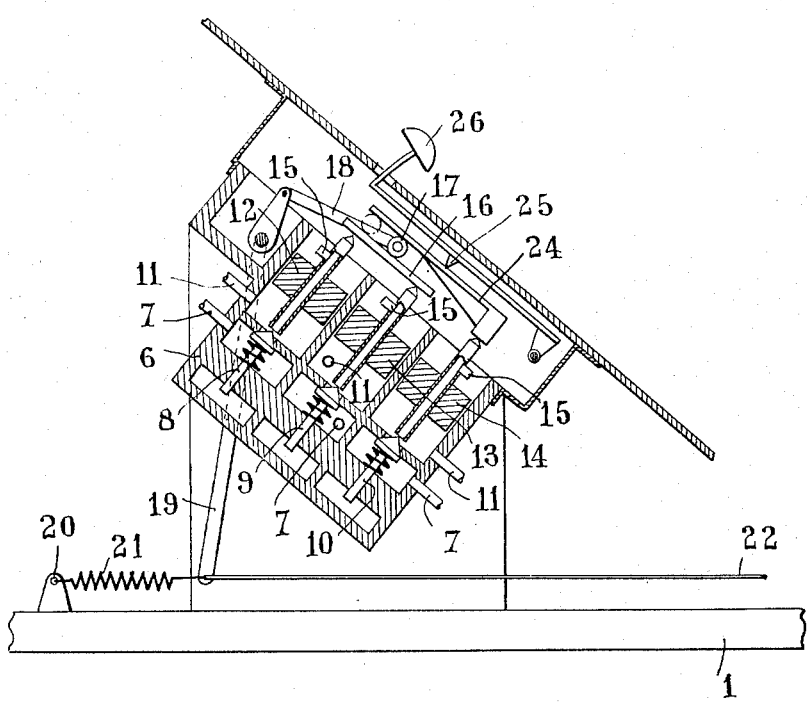
FIGURE 2 is a sectional view showing on a larger scale the braking force distributor.

Mounted on the tractor frame 1 is a triple distributor of compressed air for braking purposes. This distributor comprises a body 6 incorporating compressed-air inlets 7 leading into three chambers closed by spring-loaded valves 8, 9 and 10 controlling the communication with corresponding upper chambers in which three pipe lines 11 leading to the brakes of the three axles are provided, the delivery of braking air being controlled by actuating said valves by means of the shanks of three slide valves 12, 13 and 14 respectively. Thus, these slide valves 12, 13 and 14 are adapted, when they are moved downwards as seen in FIGURE 2, to control the brake application respectively in the front axle of the tractor, in the rear axle of the tractor and in the single axle of the trailer. The heads of these slide valves are provided with return exhaust ports 15.

The heads of slide valves 12 and 13 are engaged by a compensator lever 16 engaged in turn by a roller 17 moving automatically thereon between the bearing points of the two slide valves in a manner responsive to the load carried by the tractor. To this end, a link 18 carrying at one end the roller 17 has its opposite end pivoted to one end of a lever 19 having in turn its opposite end secured on the one hand to a fixed point 20 of the tractor frame 1 through the medium of a traction spring 21 and, on the other hand, to the axle 2 through the medium of a cable 22 and a bell-crank lever 23 fulcrumed on the frame 1. The movement thus impressed to the roller 17 as a consequence of the linkage described herinabove is proportional to the elastic movement of the rear axle 2 under the frame 1 and, therefore, to the load actually supported by the axle concerned.

Another compensator lever 24 engages the head of slide valve 14 and the roller 17. This lever 24 is responsive to a knob 25 rigidly carried by the underface of the lever of the brake pedal 26.

In this construction the relative dimensions of the elements controlling the movements of roller 17 are for example such as to provide respectively in the no-load and full-load conditions, specific positions of this roller whereby the ratio of the distance from this roller to the axes 12 and 13 of the two slide valves be equal to the ratio obtaining between the loads of the rear axle and front axle of the tractor. On the other hand, the knob 25 is so mounted on the lever of the brake pedal 26 as to provide, in the average load conditions of the tractor and trailer assembly, a ratio of distances from this knob 25 to the bearing points respectively of the roller 17 and slide valve head 14 which is equal to the ratio of the total load supported by the two tractor axles to the load supported by the single axle of the trailer.

In the example described hereinabove with reference to the drawing the actuation of the brakes by means of compressed air is contemplated. In fact, compressed air is used for braking a trailer with a compressed fluid distributed by the tractor. In certain cases the arrangement constituting the subject-matter of this invention could be applied as well to an assembly wherein the three brakes were actuated by means of a hydraulic fluid. In this case it would be well, in order to demand to the driver a braking effort substantially independent of load, to dimension the relative spacing of the inner component elements of the triple distributor in accordance with the data given in the U.S. Patent Ser. No. 416,207.

Other modifications may be brought to the specific form of embodiment described hereinabove, without inasmuch departing from the spirit and scope of the invention. Thus, notably, the movement of the roller responsive to the load distribution among the first and second axles, instead of being controlled by the height of the tractor frame on the rear axle, may be controlled directly by the pressure of the hydraulic fluid of a hydro-elastic suspension system associated with this axle.

What I claim is:
A system for distributing a compressed braking fluid among three axles of a train consisting of a two-axled tractor and a single-axled trailer, which comprises three reaction slide valves having parallel axes, two of said slide valves controlling the brakes of the tractor axles, the third slide valve controlling the brakes of the trailer axle, a compensator lever engaging said first and second slide valves, a roller engaging said compensator lever, means for automatically displacing said roller along said compensator lever between the parallel axes of said first and second slide valves in a manner responsive to the tractor load, another compensator lever engaging said roller and said third slide valve, a brake pedal fulcrumed above said other compensator lever and a knob carried by said brake pedal and adapted to engage said other compensator lever.

No references cited.

EUGENE G. BOTZ, *Primary Examiner.*